(12) United States Patent
Srinivasaraghavan et al.

(10) Patent No.: US 11,620,342 B2
(45) Date of Patent: Apr. 4, 2023

(54) RELEVANCE-BASED SEARCH AND DISCOVERY FOR MEDIA CONTENT DELIVERY

(71) Applicant: Verizon Patent and Licensing Inc., Arlington, VA (US)

(72) Inventors: Haripriya Srinivasaraghavan, Plano, TX (US); Praveen Kumar Bandaru, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 483 days.

(21) Appl. No.: 16/368,135

(22) Filed: Mar. 28, 2019

(65) Prior Publication Data

US 2020/0311150 A1 Oct. 1, 2020

(51) Int. Cl.
*G06F 16/903* (2019.01)
*G06F 16/9035* (2019.01)
(Continued)

(52) U.S. Cl.
CPC ...... *G06F 16/90335* (2019.01); *G06F 3/0482* (2013.01); *G06F 16/9035* (2019.01); *G06F 16/9038* (2019.01); *G06F 16/90324* (2019.01)

(58) Field of Classification Search
CPC ...... G06F 16/73; G06F 16/732; G06F 16/738; G06F 16/74; G06F 16/743; G06F 16/735;
(Continued)

(56) References Cited

U.S. PATENT DOCUMENTS 8,850,490 B1 * 9/2014 Thomas ............. H04N 21/2543
725/61
8,949,250 B1 * 2/2015 Garg .................... G06F 16/332
707/748
(Continued)

FOREIGN PATENT DOCUMENTS

WO WO 02/037328 A2 * 5/2002 ............. G06F 17/30

OTHER PUBLICATIONS

A. Chatterjee, B. Sarkar, P. Chandraghatgi, K. Seal and G. Ananthakrishnan, "Search based Video Recommendations," 2013 Fourth National Conference on Computer Vision, Pattern Recognition, Image Processing and Graphics (NCVPRIPG), Jodhpur, 2013, pp. 1-5, doi: 10.1109/NCVPRIPG.2013.6776190. (Year: 2013).*

(Continued)

*Primary Examiner* — Kieu D Vu
*Assistant Examiner* — Rami R Okasha

(57) ABSTRACT

A method, a device, and a non-transitory storage medium are described, which provide for calculating a first relevance score for each content item of a set of content items, wherein the first relevance scores correspond to a relevance of each content item with respect to a query term according to a term-weighting scheme; calculating, for each content item, a program title relevance score; a media personality relevance score; a media network relevance score; and a live programming event relevance score; ranking each content item based on the program title relevance scores, the media personality relevance scores, the media network relevance scores, and the live event relevance scores; receiving a user input search term; generating, based on the search term, a user interface including multiple graphic icons corresponding to a number of the ranked content items; and presenting, via the user interface, the multiple graphic icons for selection by a user.

20 Claims, 5 Drawing Sheets

(51) Int. Cl.
  *G06F 3/0482* (2013.01)
  *G06F 16/9032* (2019.01)
  *G06F 16/9038* (2019.01)

(58) Field of Classification Search
  CPC .... G06F 16/78; G06F 16/783; G06F 16/7867; G06F 16/903; G06F 16/9032; G06F 16/9038; G06F 16/904; G06F 16/9035; G06F 16/907; G06F 16/908; G06F 16/9535; G06F 16/9536; G06F 3/0482; G06F 3/04817; G06F 16/90335; G06F 16/90324; G06F 9/451; G06F 16/75; H04N 21/472
  See application file for complete search history.

(56) References Cited

U.S. PATENT DOCUMENTS

| | | | | |
|---|---|---|---|---|
| 9,843,649 | B1* | 12/2017 | Hampson | G06Q 30/0264 |
| 2003/0195877 | A1* | 10/2003 | Ford | G06F 16/951 |
| 2007/0174872 | A1* | 7/2007 | Jing | H04N 5/44543 |
| | | | | 725/46 |
| 2007/0203891 | A1* | 8/2007 | Solaro | G06F 16/951 |
| 2007/0209025 | A1* | 9/2007 | Jing | G06F 16/9038 |
| 2008/0172362 | A1* | 7/2008 | Shacham | G06F 16/338 |
| 2010/0153885 | A1* | 6/2010 | Yates | H04N 21/4532 |
| | | | | 715/841 |
| 2012/0131447 | A1* | 5/2012 | Park | H04N 21/858 |
| | | | | 715/239 |
| 2012/0143956 | A1* | 6/2012 | Svendsen | H04N 7/17336 |
| | | | | 709/204 |
| 2013/0144856 | A1* | 6/2013 | Peters | G06F 16/24578 |
| | | | | 707/706 |
| 2014/0082647 | A1* | 3/2014 | Verrilli | H04N 21/4828 |
| | | | | 725/14 |
| 2014/0101142 | A1* | 4/2014 | Gomez Uribe | G06F 16/435 |
| | | | | 707/723 |
| 2014/0101192 | A1* | 4/2014 | Sabah | G06F 16/435 |
| | | | | 707/769 |
| 2014/0157329 | A1* | 6/2014 | Roberts | H04L 67/10 |
| | | | | 725/61 |
| 2014/0223480 | A1* | 8/2014 | Berry | H04N 21/4826 |
| | | | | 725/40 |
| 2014/0250180 | A1* | 9/2014 | Tseng | H04N 21/251 |
| | | | | 709/204 |
| 2014/0365481 | A1* | 12/2014 | Novosel | G06F 16/904 |
| | | | | 707/728 |
| 2015/0245105 | A1* | 8/2015 | Wickenkamp | H04N 21/252 |
| | | | | 725/44 |
| 2015/0281635 | A1* | 10/2015 | Tang | H04N 5/76 |
| | | | | 386/295 |
| 2017/0031916 | A1* | 2/2017 | Sayyadi-Harikandehei | |
| | | | | G06F 16/243 |
| 2017/0193064 | A1* | 7/2017 | Judd | G06F 16/248 |
| 2017/0357733 | A1* | 12/2017 | Lobo | G06F 3/0488 |
| 2018/0060325 | A1* | 3/2018 | Taylor | G06F 16/2228 |
| 2018/0067945 | A1* | 3/2018 | Jain | G06Q 30/0241 |
| 2018/0124444 | A1* | 5/2018 | van Zwol | H04N 21/4668 |
| 2018/0181569 | A1* | 6/2018 | Jarr | G06F 16/5838 |
| 2018/0246898 | A1* | 8/2018 | White | G06Q 30/0631 |
| 2019/0149887 | A1* | 5/2019 | Williams | G06F 3/04817 |
| | | | | 725/52 |
| 2020/0005196 | A1* | 1/2020 | Cai | G06N 5/02 |
| 2020/0104946 | A1* | 4/2020 | Mason | G06Q 10/10 |
| 2020/0167433 | A1* | 5/2020 | Karayev | G06F 16/9032 |

OTHER PUBLICATIONS

W. Jia, H. Jin and X. Liao, "A new video search approach based on user's preference and query ambiguity," The International Conference on Information Networking 2013 (ICOIN), Bangkok, 2013, pp. 493-498, doi: 10.1109/ICOIN.2013.6496429. (Year: 2013).*

Surtees, Carrie, "New UI update enhances discoverability across Netflix, Hulu, PlayStation Vue, YouTube, and more," (Mar. 29, 2018), PlayStation Blog, https://blog.playstation.com/2018/03/29/introducing-a-new-tv-video-discovery-experience-on-ps4/ Retrieved Aug. 31, 2020 (Year: 2018).*

* cited by examiner

Results
| Image | Name | Type | Score | Imdb |
|---|---|---|---|---|
|  HIGH JINKS | | TV | 5415 (57,531,1) | 7.9 (3477) |
|  HISTORIOLOGICAL TV | | Channel | 45414 (167,240) | |
| 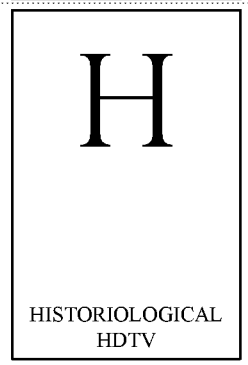 HISTORIOLOGICAL HDTV | | Channel | 44426 (163,240) | |
| 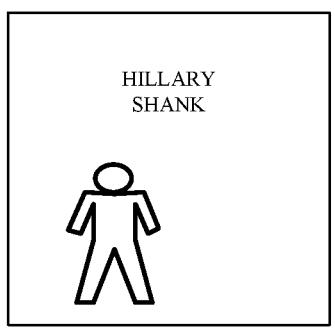 HILLARY SHANK | | Person | 201 (44) | |
510 — 520 — 530 — 540
Fig. 5

RELEVANCE-BASED SEARCH AND DISCOVERY FOR MEDIA CONTENT DELIVERY

BACKGROUND

Content networks use various network devices to manage digital media content ("titles," "programs," or "items") and corresponding aggregated metadata (e.g., catalogs, indexes, etc.) which are searchable by subscribers. A content delivery service, responsive to queries received from a subscriber, employ search, selection, and recommendation systems that filter, identify, and present media content titles that are potentially of interest to the subscriber. Subscriber satisfaction with the search experience depends on the relevance of the results returned, as well as the time and effort involved in formulating a query.

BRIEF DESCRIPTION OF THE DRAWINGS

FIG. 5 is a diagram illustrating an exemplary content search and discovery user interface (UI).

DETAILED DESCRIPTION OF PREFERRED EMBODIMENTS

Figure 1:
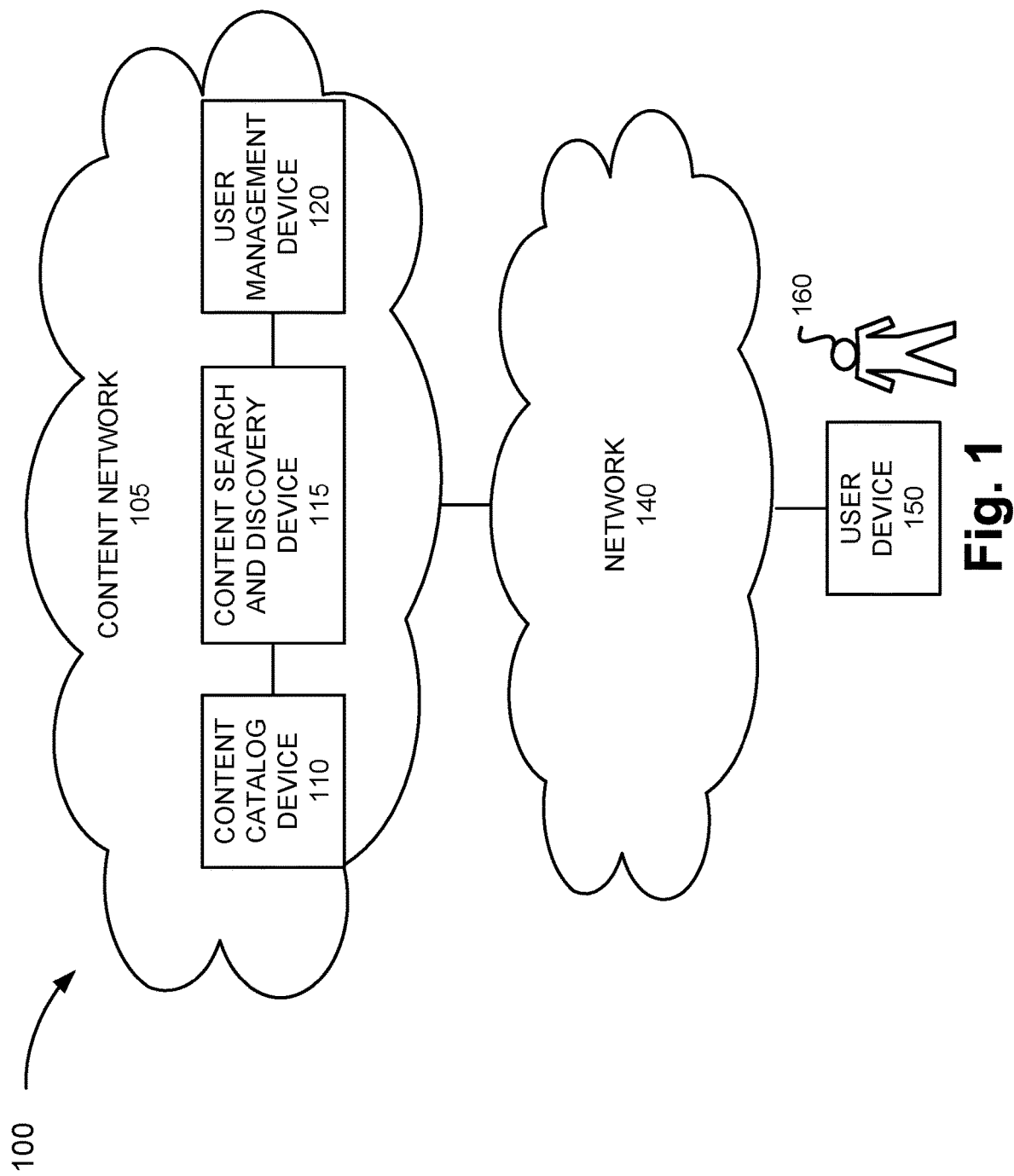
FIG. 1 is a diagram illustrating an exemplary environment in which exemplary embodiments of a relevance-based content search system may be implemented.

The following detailed description refers to the accompanying drawings. The same reference numbers in different drawings may identify the same or similar elements. Also, the following detailed description does not limit the invention.

Consumers of digital media content are subjected to the time-consuming task of sifting through an ever-expanding collection of media content (e.g., video, audio, text, web pages, etc.) that is available for consumption from media content providers. Intelligent content search and discovery technology—designed to search and return available content responsive to user queries—has not kept pace with advances in media content generation/delivery capabilities. Existing content search and discovery services, for example, do not account for and/or appropriately weigh one or more factors that must be considered to determine content relevance to users' search terms. Consequently, existing content search and discovery systems may unnecessarily expend network resources by generating less-than-optimal search results for users. Further, network resources may be also unproductively used to present the undesirable content to the users, which may result in extended browsing sessions and lower user content-selection rates. Accordingly, the individual user experience would be improved, and the consumption of media content generally increased, by more efficiently-performing content offering filtering and selection.

According to exemplary embodiments, a relevance-based content search and discovery interface is described. For example, the interface is provided by a content delivery system that includes logic to associate search strings to cataloged content items from a content collection, based on both personalized and non-personalized factors for correlating content to search terms. As described herein, search strings may include a single character (e.g., a letter, a numeral, a special character, etc.), a single term of multiple characters, and/or multiple terms.

According to an exemplary embodiment, the relevance-based content search and discovery system provides the content offerings interface based on dynamically updated, content-related data. According to such an embodiment, the relevance-based search and discovery system uses content metadata, client-side media consumption logs, and content provider catalogs and/or indices. The system may assign base relevance scores for each content item ("document") in a content collection, with respect to each search term. The base relevance score may be calculated, for example, using a term-weighting scheme. In some embodiments, the term-weighting scheme may be term frequency-inverse document frequency (TF-IDF). The TF-IDF value for a term-document pairing is a numerical statistic that reflects how important a given term is to each document in the content collection. According to an exemplary embodiment, the base relevance score is modified as described herein according to a document type associated with the document.

According to another exemplary embodiment, the relevance-based content search and discovery system modifies the base relevant scores using predetermined sets of modifiers (e.g. multiplicative) for content items that can be categorized, for example, as provider networks (e.g., channels/stations), personalities (e.g., persons, talent), programs (e.g., movies, recorded videos, TV shows, etc.), and/or live events (e.g., sporting events, awards shows, newscasts, concerts, etc.). According to such an exemplary embodiment, the relevance-based content search and discovery system applies the pre-determined set of modifier values to the base relevance score to determine a final relevance score for a content item with respect to a given search term.

According to an exemplary embodiment, relevance modifiers may include historical search data indicating a measure of how many times a particular content item has been selected by users after a search for a particular query term. Another relevance modifier may include a quantifiable "popularity" factor for each content item that corresponds to overall user views of each content item. Another relevance modifier may include a quantifiable "quality" factor for each content item, for example, that is derived from ratings reviews, critic reviews, etc. Another relevance modifier may include a quantifiable "recency" factor for each content item, which reflects a general loss of consumer interest in a content item after its initial availability. Another relevance modifier may include a quantifiable "cyclicity" or "seasonality" factor for each content item with respect to the time-of-day, day-of-week, week-of-the-month, month-of-the-year, etc. associated with a user's search query. Another relevance modifier may include a quantifiable "similarity" of one content item to another. Another relevance modifier may include a relative cost to the user for consumption of a content item. Another modifier may include a particular user's consumption rights for any given content item. Other relevance modifiers are possible.

In view of the foregoing, the relevance-based content search and discovery interface, as described herein, improves the media content offering experience by condensing a content collection according to prescribed functions to feature content of prime interest to a user. For example, the relevance-based content search and discovery system searches, identifies, and presents content items that represent the top content items responsive to a user's query terms. Consequently, network resources that are used to generate the content offerings may be reduced relative to existing content search and discovery systems. Additionally, the relevance-based content search and discovery interface may reduce overall content search times, reduce utilization of processing resources (e.g., processor, memory, etc.), and present select content items to a user for consideration and selection more efficiently and/or accurately over time than existing search and discovery systems, thereby improving the user experience and minimizing network resource usage.

FIG. 1 is a diagram illustrating an exemplary environment 100 in which an exemplary embodiment of the relevance-based content search and discovery interface may be implemented. As illustrated, environment 100 includes a content network 105 and a network 140. Content network 105 may include a content catalog device 110, a content search and discovery device 115, and a user management device 120. According to other embodiments, environment 100 may include additional networks, fewer networks, and/or different types of networks than those illustrated and described herein. Environment 100 also includes an end device 150 that may be operated by a user 160.

The number and arrangement of network devices in content network 105, and the number of end devices 150 are exemplary. According to other embodiments, environment 100 may include additional devices, fewer devices, and/or differently arranged devices, than those illustrated in FIG. 1. For example, a single device in FIG. 1 may be implemented as multiple devices and/or multiple devices may be implemented as a single device. A network device may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, a cloud device, a virtualized function, etc). The number and the type of network devices illustrated in environment 100 are exemplary.

Environment 100 includes communication links between the networks and communication links between the network devices. Environment 100 may be implemented to include wired, optical, and/or wireless communication links among the devices and the networks illustrated. A communicative connection via a communication link may be direct or indirect. For example, an indirect communicative connection may involve an intermediary device and/or an intermediary network not illustrated in FIG. 1. The number and the arrangement of communication links illustrated in environment 100 are exemplary.

Content network 105 includes a network that provides access to and use of a content service. Generally, content network 105 may be implemented as a satellite-based network, a terrestrial-based network, or a combination thereof. Content network 105 may be implemented to distribute content using various technologies, such as an optical architecture, a coaxial cable architecture, an Internet Protocol (IP) TV architecture, a digital subscriber line (DSL) architecture, a wireless architecture, and/or an Internet-based architecture. Depending on the architecture implemented, content network 105 may include various types of network devices that contribute to the access and use of the content service by users.

According to an exemplary embodiment, content network 105 includes network devices that provide the relevance-based content search and discovery interface, as described herein. According to an exemplary embodiment, the relevance-based content search and discovery interface is provided based on content catalog device 110, content search and discovery device 115, and user management device 120.

Content catalog device 110 includes a network device that stores and manages cataloged metadata of titles of media content. According to an exemplary embodiment, the media content may be audio and visual content, such as, for example, movies, television shows, network broadcasts, video-on-demand (VOD), and the like. According to other exemplary embodiments, content titles may include audio content, such as, for example, music, and/or other forms of content (e.g., text, multimedia, etc.). Content catalog device 110 may be implemented to include a mass storage device. Content catalog device 110 may include logic that provides various storage-related functions, such as, add, delete, update, etc., the metadata. Content catalog device 110 may include logic that performs a query process. For example, content catalog device 110 may receive a query request from content search and discovery device 115, generate a query response, and transmit the response to content search and discovery device 115. According to other exemplary embodiments, content catalog device 110 may not include logic that performs the query process.

The metadata may include, for example, data indicating a title of a content, genres and/or sub-genres of the content, cast and crew information, storyline information (e.g., plot summary, synopsis, tagline, descriptions, etc.), a movie rating or a television rating (e.g., R, PG-13, TV 14, etc.), a date of release, a language, a runtime, a video format (e.g., 4K, HD, 3D, etc.), an audio format (e.g., stereo, Dolby Surround 7.1, etc.), filming location information, company credit information (e.g., production company, distributor, etc.), rating (e.g., user, critic, etc.), review (e.g., user, critic, etc.) and/or other information that pertains to the content (e.g., an image, a video trailer, web site address, etc.). In one embodiment, the metadata may include associated cost information (e.g., price) for the content titles. According to other exemplary embodiments, content catalog device 110 may store the metadata in various types of data structures or mass storage information entities (e.g., a database, etc.). A further description of the metadata is described below.

Figure 2:
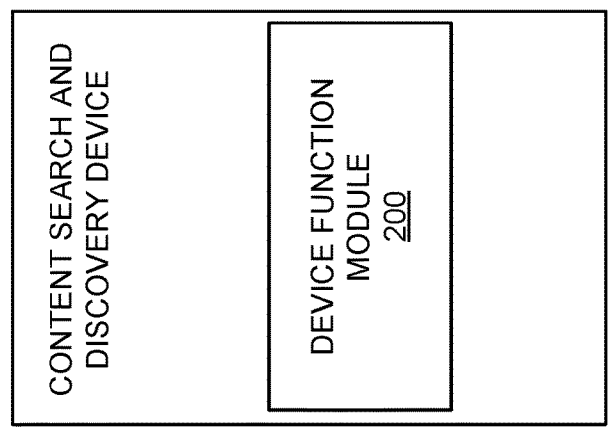
FIG. 2 is a block diagram illustrating exemplary logical components of a content search and discovery device of FIG. 1.
Figure 3:
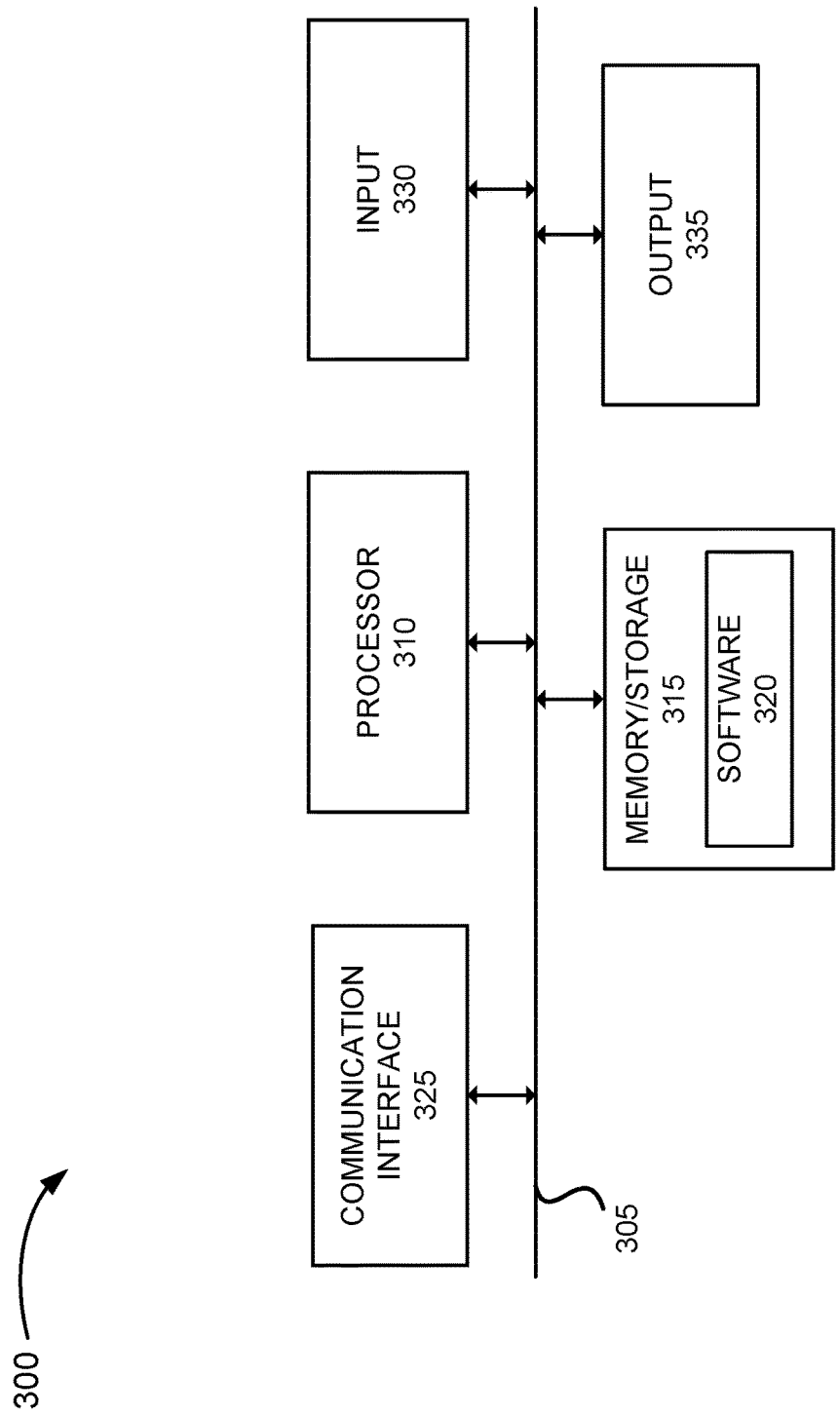
FIG. 3 is a diagram illustrating exemplary components of a device that may correspond to one or more of the devices illustrated and described herein.

FIG. 2 is a block diagram illustrating exemplary logical components of content search and discovery device 115 that may be operated by a content service provider. The functions described in connection with FIG. 2 may be performed by one or more components of device 300 (FIG. 3). The logical block of FIG. 2 may be included, for example, in an application (e.g., software 320), stored in memory/storage 315 and executed by processor 310. As shown in FIG. 2, content search and discovery device 115 may include a device function module 200 that allows content service providers to perform content search and discovery operations, as described herein. Other configurations may be implemented. Therefore, content search and discovery device 115 may include additional and/or different logical components than those depicted in FIG. 2.

Device function module 200 may include logic that performs user interface configuration and/or search and discovery of content items based on the information received from content catalog device 110, user management device 120, and user device 150, and/or user interaction by user 160 (e.g., selecting/not selecting offered content). According to an exemplary embodiment, device function module 200 provides a user interface (e.g., graphical user interface (GUI)) that obtains user information (e.g., from user device 150) and provides candidate content items to user device 150 based on query terms input by user 160. According to various exemplary embodiments, device function module 200 provides content relevance-based filtering and/or ordering of content items via the content search and discovery interface to user device 150. In some embodiments device function module 200 may include machine learning logic.

According to an exemplary embodiment of the content search and discovery interface, device function module 200 provides a base relevance score and a modified or final relevance score for each content item with respect to a search term that may be received from user 160. In one implementation, device function module 200 may assign a base relevance score for each content item that may be offered to user 160 in response to a particular search term, for example, using term frequency-inverse document frequency (TF-IDF), or some other term-weighting scheme.

In one embodiment, device function module 200 may classify each stored content item as one or more of a media network, a media personality, a movie/TV show, or live event programming. Other classifications are possible that may relate to a characteristic or metadata of the content item. Device function module 200 modifies the base relevance score by applying a predetermined number of different types of modifiers to the base relevance score according to the classification of the content item. In this embodiment, each of the classifications may include a modifier that uses historical user selection data with respect to content item offerings presented to users for a given search term. For some embodiments, each modifier value in the set of modifiers may be, for example, a numerical function of observed data, such that the modifier values are substantially within a same range and/or order of magnitude (e.g., between 1-10 or another numerical range).

In some embodiments, historical user selection data may be used to generate an "autosuggest" modifier value for a search string, which may be used to modify the base relevance score. For example, when a user searches term "t" and then selects content item "i" from the search results, device function module 200 increments $A(i,t)$, such that the final $A(i,t)$ is a measure of how many times users have selected content item, i, after searching for the term t. When $A(i,t)$ reaches a large number (e.g., a threshold value), a final autosuggest value, A', may be calculated according to the exemplary equation, $$A'(i,t) = \log_{10}(\max(A(i,t), 10)) \quad (1)$$

Other formulations are possible to generate a value in the range of 1-10, for example.

In one implementation, device function module 200 may, for a content item classified as a media network (e.g., channel/station), use a predetermined number of modifiers to calculate a final relevance score (s') for each media network, n, with respect to a search term, t. In one embodiment, the modifiers for the media network base relevance score may include an autosuggest modifier, A'; and a popularity index, P, that is based on a popularity (e.g., viewership data) of the network. For example, for each network, n, the logic increments each viewing, v(n). Device function module 200 may compute a popularity index, P, for each content item, i, according to the exemplary equation, $$P(i) = ((v(i) - v\_\min)/(v\_\max - v\_\min) \cdot 10) + 1 \quad (2)$$

where v_max corresponds to the largest viewership for any content item and v_min corresponds to the least viewership for any content item. In this embodiment, the base relevance score, s, may be multiplied by the autosuggest value, A', and the popularity index, P, to calculate the final relevance score, s'(i), for each item, i, for a given search term.

$$s'(i) = s \cdot A'(i,t) \cdot P(i) \quad (3)$$

In one implementation, device function module 200 may, for a content item classified as a live programming event (e.g., sporting event, newscast, concert, awards show, pay-per-view, etc.), use a predetermined number of modifiers to calculate a final relevance score for each live programming event, l, with respect to a search term, t. In one embodiment, the modifiers to be applied to the live programming event base relevance score may include an autosuggest modifier, A'; a popularity index, P; a season/cyclicity index, c, that is based on past viewership data for the event and/or similar events, for a given time-of-day, day-of-week, week-of-month, month-of-year with respect to the time/day/week/month/year of the query; and a time decay factor, d, which is based on the recency of the live programming event (l).

For example, for each live programming event (l), device function module 200 increments each of a time-of-day, day, week, month, and year bin per viewing, where the bins total to $c(l,t_0)$. The time decay factor (d) may be a value of 1.0 that decays exponentially, for example, beginning at a designated time (e.g., 2 hrs, 4 hrs, etc.) after origination of the event (l) and/or when the program becomes available. In one embodiment, the initial value may decay to 50% after a designated amount of time, for example, one or more days to one or more weeks. Other decay formulas may be used, for example a Gaussian decay (4.0 hr, 1 wk, 0.5). In this embodiment, the base relevance score, s, may be multiplied by the seasonality index (c), the autosuggest value (A'), the popularity index (P), and the decay factor (d), to calculate the final relevance score, s'(l), for each live event programming, l, for a given search term (t).

$$s'(l) = s \cdot c(l,t_0) \cdot A'(l,t) \cdot P(l) \cdot d(l) \quad (4)$$

In one implementation, device function module 200 may, for a content item classified as a personality (e.g., actor, entertainer, athlete, politician, etc.), use a predetermined number of modifiers to calculate a final relevance score for each personality, p, with respect to a search term, t. In one embodiment, the modifiers to be applied to the personality base relevance score may include an autosuggest modifier, A'; a popularity index, P; a filmography index, f, that is based on a mediography of x number of content items in which the personality is credited; an awards index, a, which is based on y number of awards (e.g., Oscars, Grammy, Tony, music industry awards, etc.) won by the personality; and a time decay factor, d, which is based on a recency of the personality's media activities.

For example, device function module 200 increments each personality (p) that appears in or is otherwise associated with a content item, and the mediography index (f) may be applied to the base relevance score s(p) as a "boost factor," for example, for every x (e.g., 3, 5, 10, etc.) number of items to the personality's credit. The appearances/credits may be weighted differently for different content items and/or different roles performed (e.g., top billing in a major motion picture versus bit part in a made-for-TV documentary). As another example, device function module 200 increments each personality (p) that wins an award or other professional recognition related to one or more of their associated content items, and the award index (a) may be applied to the base relevance score s(p) as a "boost factor," for example, for every x (e.g., 3, 5, 10, etc.) number of awards to the personality's credit. Device function module 200 may apply a time decay factor (d) that decays exponentially, for example, beginning at 1.0 from a designated time (e.g., one year, etc.) after the last award and/or content item release. In one embodiment, the initial value may decay to 50% after a designated amount of time, for example, one or more years to five or ten years. Other decay formulas may be used, for example a Gaussian decay (1.0 yr, 10 yr, 0.5). In this embodiment, the base relevance score, s, may be multiplied by the autosuggest value (A'), the popularity index (P), the mediography index (f), the awards index (a), and the decay factor (d), to calculate the final relevance score, s'(p), for each personality (p), for a given search term (t), according to the equation $$s'(p)=s*A'(p,t)*P(p)*f(p)*a(p)*d(p) \quad (5)$$

According to an exemplary embodiment, device function module 200 may, for a content item classified as a program title offering (e.g., name of a movie, TV show, video, other recording, etc.), use a predetermined number of modifiers to calculate a final relevance score for each title offering, o, with respect to a search term, t. In one embodiment, the modifiers to be applied to the title offering base relevance score may include an autosuggest modifier, A'; a popularity index, P; a seasonality index, c; a quality index, q, which is based on reviews and ratings obtained from third party sources such as Rotten Tomatoes and IMDB, etc.; and a time decay factor (d) that is based on a recency of the title offering's production and/or release.

For example, device function module 200 generates a quality index from reviews and ratings for each program offering (o) using, for example, the equation:

$$q=\text{sqrt}(\text{quality\_score})*\log_{10}(\max(\text{quality\_votes}-\text{threshold\_votes},10)) \quad (6)$$

in which in which the "quality score" corresponds to a numerical rating (e.g., 1-10, etc.) and/or a "star" rating associated with each title offering (o); "quality votes" corresponds to the number of reviews on which the quality score is based; and "threshold votes" is a configurable minimum number of reviews to weight the quality index. Device function module 200 may apply a time decay factor (d) that decays exponentially, for example, beginning at 1.0 from a designated time (e.g., 3 months, etc.) after the latest episode and/or release of each title offering (o). In one embodiment, the initial value may decay to 50% after a designated amount of time, for example, 1-2 years. Other decay formulas may be used, for example a Gaussian decay (0.25 yr, 2 yr, 0.5). In this embodiment, the base relevance score, s, may be multiplied by the autosuggest value (A'), the popularity index (P), the seasonality index (c), the quality index (q), and the decay factor (d), to calculate the final relevance score, s'(p), for each title offering (o), for a given search term (t), according to the equation:

$$s'(o)=s*c(o,t_0)*A'(o,t)*P(o)*q(o)*d(o) \quad (7)$$

Referring back to FIG. 1, user management device 120 includes a network device that stores user profile information pertaining to users of the content delivery service. For example, the user profile information may include historical information pertaining to the user, such as information pertaining to previous search results (e.g., candidate offerings and/or forms of user input tracking), and media content selected and/or consumed (client-side logs). The user profile information may also include user account information that may indicate a user account for accessing the content delivery service. Additionally, for example, the user profile information may include demographic information of the user, a user identifier associated with the user, and user device information. For example, the user may set various parameter values pertaining to the content delivery service, as described herein, and/or indicate a preference among content genres, viewing patterns, habits, or trends.

Although not illustrated, content network 105 may include other types of network devices that provide various content services, such as a content processing device (e.g., transcoding, encryption, machine learning, etc.), a digital rights management device, a licensing device, a login device (e.g., authentication, authorization, etc.), a billing device, and a content server device.

Network 140 includes one or multiple networks of one or multiple types. For example, network 140 may be implemented to include a terrestrial network, a content delivery network, a wireless network, a wired network, an optical network, a radio access network, a core network, a packet network, an Internet Protocol (IP) network, the Internet, the World Wide Web, a private network, a public network, a television distribution network, a streaming network, a mobile network, and/or other type of network that provides access to content network 105.

User device 150 includes a device that has computational and communication capabilities. User device 150 may be implemented as a mobile device, a portable device, or a stationary device. By way of further example, user device 150 may be implemented as a smartphone, a personal digital assistant, a tablet, a netbook, a phablet, a wearable device, a set-top box, an infotainment system in a vehicle, a smart television, a game system, a music playing system, a computer (e.g., a desktop, a laptop, etc.), or some other type of user device. According to various exemplary embodiments, user device 150 may be configured to execute various types of software (e.g., applications, programs, etc.). The number and the types of software may vary among user devices 150. According to an exemplary embodiment, user device 150 includes software that provides access to and/or use of the content delivery service, which includes the content search and discovery interface, as described herein. For example, the software may be implemented as a browser, a mobile application, or other type of client application.

FIG. 3 is a diagram illustrating exemplary components of a device 300 that may be included in one or more of the devices described herein. For example, device 300 may correspond to components included in network devices of content network 105 and/or user device 150. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. As an example, with reference to network devices of content network 105, software 320 may include an application that, when executed by processor 310, provides the functions of the personalized content recommendation interface, as described herein. Software 320 may also include firmware, middleware, microcode, hardware description language (HDL), and/or other form of instruction. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces and/or wired interfaces. For example, communication interface 325 may include one or multiple transmitters and receivers, or transceivers. Communication interface 325 may operate according to a protocol stack and a communication standard. Communication interface 325 may include an antenna. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a touchscreen, a touchless screen, a button, a switch, an input port, speech recognition logic, and/or some other type of visual, auditory, tactile, etc., input component. Output 335 permits an output from device 300. For example, output 335 may include a speaker, a display, a touchscreen, a touchless screen, a light, an output port, and/or some other type of visual, auditory, tactile, etc., output component.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
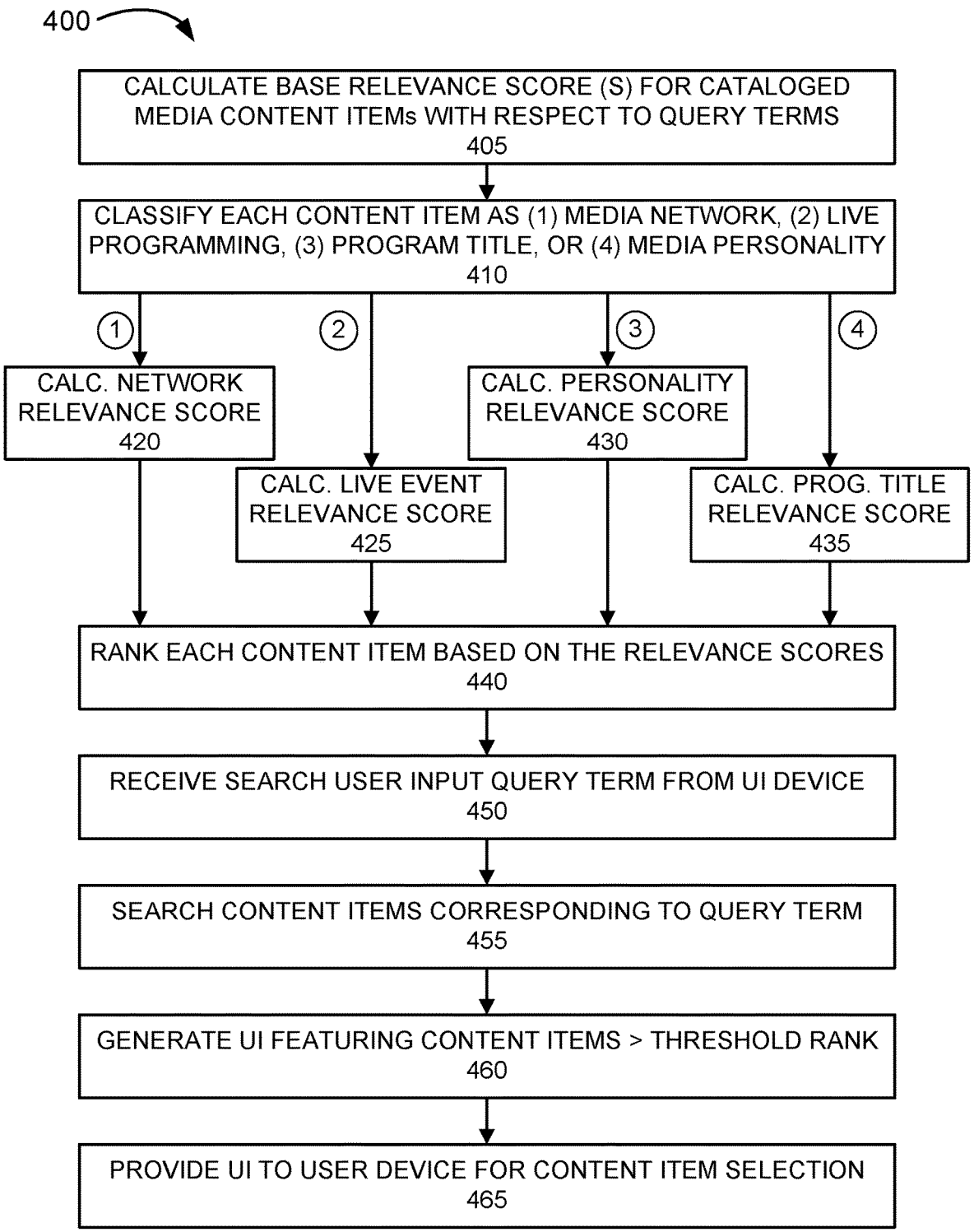
FIG. 4 is a flow diagram illustrating an exemplary process of an exemplary embodiment of the content search and discovery interface.

FIG. 4 is a flow diagram illustrating an exemplary process 400 of an exemplary embodiment of the personalized content recommendation interface based on users' sensitivity to content price and content relevance. Process 400 is directed to a process described herein with respect to FIGS. 1, 2, and, 5, as well as elsewhere in this description, in which the relevance-based content search and discovery interface is provided. According to an exemplary embodiment, a network device (e.g., content search and discovery device 115) performs steps of process 400. For example, processor 310 executes software 320 to perform the steps illustrated in FIG. 4 and described herein.

According to an exemplary process 400 shown in FIG. 4, it may be assumed that user 160 associated with user device 150 has an account for the content delivery service of content network 105. User 160 may access the content delivery service via user device 150, for example, a set-top box, and process 400 may be invoked based on user login information, remote control activation, etc. received at a particular date and time. A relevance-based content search and discovery interface may be generated according to blocks 405-465 and the example UI 500 shown in FIG. 5.

Referring to FIG. 4, in block 405, content search and discovery device 115 may, using user profile information and/or content metadata information, continuously calculate a base relevance score for potential search queries from user 160 with respect to content items available from and cataloged in one or multiple databases. For example, content search and discovery device 115 may use content metadata from one or multiple catalogs and a term-weighting algorithm, such as TF-IDF, to determine base relevance values corresponding to individual content items. Each content item in a database may be indexed as a document into a reverse index and potential query terms are searched against the corpus documents. The TF-IDF value may increase proportionally to the number of times a term appears in a document and is offset by the number of times a term appears across all documents in the corpus of documents— the first portion—TF—indicates the closeness of the match and the second term—IDF—indicates the rarity of the term. According to an exemplary implementation, content search and discovery device 115 may apply a logarithmic or other function to the raw TF-IDF value, for example, such that substantially all of the base relevance scores (s) are within one or two orders of magnitude.

In block 410 content search and discovery device 115 may classify each content item as one of a (1) particular media network (e.g., channel/station, etc.), a (2) live programming event (e.g., sporting event, etc.), a (3) title of a program (e.g., movie, TV show, etc.), or a (4) media personality (e.g., talent, crew, etc.). Content search and discovery device 115 may store information regarding the classification with metadata associated with the content items and/or in a separate database structure.

In block 420, content search and discovery device 115 may apply a set of multiplicative modifiers to the base relevance score (s) to calculate a final relevance-based score (s') for each media network (n) in the catalog with respect to potential search terms (t). According to such an exemplary implementation, content search and discovery device 115 may use parameters including an autosuggest value (A') and popularity index (P) to modify the base relevance score (s). Assume for purposes of this example, content search and discovery device 115 may determine the TF-IDF value for the Historiological TV network (n) to be 167 (i.e., base relevance score (s)). Content search and discovery device 115 may determine that, over some time period (e.g., previous week, month, etc.), when content service users input the search term "hi," 115,000 users selected the Historiological TV (autosuggest value (A)). Content search and discovery device 115 may adjust the autosuggest value A(Historiological TV, hi) using equation (1) above, to calculate a final autosuggest value (A') of 5.06. Content search and discovery device 115 may determine that, over the same time period, the Historiological TV was viewed by 150,000 users (v(Historiological TV)), and that during that same timeframe, the most-watched network was viewed by 1,000,000 users (max_v(n)), and the least-watched network by 30,000 users (min_v(n)). Content search and discovery device 115 may calculate the popularity index P(Historiological TV) according to equation (2) above to be a value of 1.4. Content search and discovery device 115 may calculate the final relevance score (s'(Historiological TV, hi) using equation (3) above to be 167*5.06*1.4=1183.

In block 425, content search and discovery device 115 may apply a set of multiplicative modifiers to the base relevance score (s) to calculate a final relevance-based score (s') for each live event (l) in the catalog with respect to potential search terms (t). Assume for this example, content search and discovery device 115 determines the TF-IDF value for the Olympic High Jump competition (l) to be 8 (i.e., base relevance score(s)). Content search and discovery device 115 may determine that, over some time period (e.g., previous week, month, etc.), when users input the search term "hi," 5,000 users selected the Olympic High Jump competition (autosuggest value (A)). Content search and discovery device 115 may adjust the autosuggest value A(High Jump, hi) using equation (1) above to calculate a final autosuggest value (A') of 3.7. Content search and discovery device 115 may determine that, over that same time period, the most recent Olympic High Jump competition was viewed by 3,000 users (v(High Jump)), and that during that same timeframe, the most-watched live event was viewed by 300,000 users (max_v(l)), and the least-watched live event by 300 users (min_v(l)). Content search and discovery device 115 may calculate the popularity index P(High Jump) according to equation (2) above to be a value of 1.1. Assume for this example, that content search and discovery determines that the corresponding seasonality index (c(High Jump,$t_0$)) to be 0.05, where $t_0$ is the time of day, day of week, week of the month, month of the year, and year that the query is input. Assume that the relatively low seasonality index (c) value of 0.5 corresponds to the search query "hi" being input during one of the three "off-years" for the Summer Olympics, as well as in a non-summer month. Content search and discovery device 115 may calculate the decay factor d(High Jump) according to an exponential time decay from the date that the most recent Olympic High Jump competition occurred and/or originally aired. Assume for this example, that the decay value originated at 1.0 and decay activity began 4 hours after that, and that the decay "half-life" period is 2 weeks, and that the search query is inputted some 26 weeks later. The decay value (d) may be calculated to be $1.0*(0.5)^{26wks/2wks}=0.001$. Content search and discovery device 115 may calculate the final relevance score (s'(High Jump, hi) using equation (4) above to be 8*0.05*3.7*0.001=0.0015.

In block 430, content search and discovery device 115 may apply a set of multiplicative modifiers to the base relevance score (s) to calculate a final relevance-based score (s') for each personality (p) in the catalog with respect to potential search terms (t). Assume for this example, content search and discovery device 115 determines the TF-IDF value for Hillary Shank (l) to be 44 (i.e., base relevance score(s)). Content search and discovery device 115 may determine that, over some time period (e.g., previous week, month, etc.), when users input the search term "hi," 100 users selected Hillary Shank (autosuggest value (A)). Content search and discovery device 115 may adjust the autosuggest value A(Hillary Shank, hi) using equation (1) above to calculate a final autosuggest value (A') of 2.0. Content search and discovery device 115 may determine that, over that same time period, content items associated with Hillary Shank were viewed by 900 users (v(Hillary Shank)), and that during that same timeframe, the most-watched content items associated with a personality were viewed by 90,000 users (max_v(p)), and the least-watched content items associated with a personality by 90 users (min_v(p)). Content search and discovery device 115 may calculate the popularity index P(Hillary Shank) according to equation (2) above to be a value of 0.08. Assume for this example, that content search and discovery device 115 determines that the corresponding filmography index (f(Hillary Shank)) to be 1.23, based on being credited in over 50 of the content items. Assume for this example, that content search and discovery device 115 determines that the corresponding awards index (a(Hillary Shank)) to be 2.5, based on her two "Best Performance" and "Best Actress" Oscar Awards and 58 other awards, as well as 41 more nominations for award. Content search and discovery device 115 may calculate the decay factor d(Hillary Shank) according to an exponential time decay from the date of the most recent major award. Assume for this example, that the decay value originated at 1.0 and decay activity began 1 year after that, and that the decay "half-life" period is 10 years, and that the search query is inputted 2 years later. The decay value (d) may be calculated to be $1.0*(0.5)^{1.0yrs/10yrs}=0.93$. Content search and discovery device 115 may calculate the final relevance score (s'(Hillary Shank, hi) using equation (4) above to be 44*2.0*0.8*1.23*2.5*0.93=201.

In block 430, content search and discovery device 115 may apply a set of multiplicative modifiers to the base relevance score (s) to calculate a final relevance-based score (s') for each title offering (o) in the catalog with respect to potential search terms (t). Assume for this example, content search and discovery device 115 determines the TF-IDF value for the TV show, High Jinks (o) to be 57 (i.e., base relevance score(s)). Content search and discovery device 115 may determine that, over some time period (e.g., previous week, month, etc.), when users input the search term "hi," 110,100 users selected High Jinks (autosuggest value (A)). Content search and discovery device 115 may adjust the autosuggest value A(High Jinks, hi) using equation (1) above to calculate a final autosuggest value (A') of 5.04. Content search and discovery device 115 may determine that, over that same time period, content items associated with High Jinks were viewed by 90,000 users (v(High Society)), and that during that same timeframe, the most-watched content offering was viewed by 590,000 users (max_v(o)), and the least-watched content offering by 590 users (min_v(o)). Content search and discovery device 115 may calculate the popularity index P(High Jinks) according to equation (2) above to be a value of 2.5. Assume for this example, that content search and discovery device 115 determines, using equation (5) above, that the corresponding quality index (q(High Jinks)) to be a value 75.4, based on review ratings Assume for this example, that the decay value originated at 1.0 and decay activity has not begun to accrue because new episodes of the program are airing at the time the search query is input. Content search and discovery device 115 may calculate the final relevance score (s'(High Jinks, hi) using equation (7) above to be 57*5.04*2.5*75.4*1.0=54,145.

Content search and discovery device 115 may perform blocks 420-435 for each content item classified in block 410. In one embodiment, content search and discovery device 115 may perform blocks 420-435 for only the content items that are available to user 160, per a subscription, for example.

In block 440, content search and discovery device 115 ranks each content item based on the associated relevance scores with respect to a search term. Content search and discovery device 115 may receive a user input concerning a search query term from user device 150 via network 140 (block 450). Content search and discovery device 115 may search the content items based on the search terms (block 455). In one embodiment, content search and discovery device 115 searches only the content items that are available to user 160, per the user profile information, for example. Assume for the example above, that the search term received is "hi." Content search and discovery device 115 may generate a user interface (UI) that features content items for "hi" that are greater then a predetermined threshold (block 460). For the example above, assume that the threshold is a relevance score of 200, and the TV show High Jinks, the Historiological TV, the Historiological TV HD, and Hillary Shank are above the threshold, while High Jump does not exceed the threshold. Content search and discovery may provide the UI to user device 150 for content item selection by user 160. In block 460, content search and discovery interface 500 (FIG. 5) may be presented via user device 150 for searching and selection based on input from user 160, in response to an input of "hi", as in the example above.

Although FIG. 4 illustrates an exemplary process 400 of content search and discovery device 115, according to other embodiments, process 400 may include additional operations, fewer operations, and/or different operations than those illustrated in FIG. 4 and described herein. Process 400 may be iteratively performed. For example, subsequent to the presentment of the search result, user 160 may additionally enter search terms (e.g., times and/or days for viewing). Process 400 may continue to any block in process 400. Process 400 may end when user 160 exits the content service, selects content to view, purchase, or download, and/or other user input (or lack thereof) that indicates a search process has ended.

Content search and discovery device 115 may determine positioning of the icons and information associated with High Jinks 510, the Historiological TV 520, the Historiological TV HD 530, and Hillary Shank 540, based on ranking information. According to various exemplary embodiments, one or more parameters of content search and discovery UI 500 may be configured by an administrator of the service provider or by the user (e.g., user 160).

In still other embodiments, any of the content items that are not currently available to user 160 may nevertheless be included in search and discovery UI 500, for example, when the associated relevance scores exceed another threshold value that is higher than the threshold value for the available content items. In the above example, content items having a relevance score that exceeds, 500, may be presented via search and discovery UI 500 and an offer made to user 160 for purchase, etc.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described with regard to the process illustrated in FIG. 4, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320). The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 310) of a device. A non-transitory storage medium includes one or more of the storage mediums described in relation to memory/storage 315.

To the extent the aforementioned embodiments collect, store or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
    calculating, by a computer device, a first relevance score for each content item of a set of content items identified in a catalog, wherein the first relevance scores correspond to a relevance of each content item with respect to a query term according to a term-weighting scheme;
    calculating, by the computer device, for each content item of the set of content items, a program title relevance score based on a first set of modifier values applied to the first relevance score;
    calculating, by the computer device, for each content item of the set of content items, a media personality relevance score based on a second set of modifier values applied to the first relevance score;
    calculating, by the computer device, for each content item of the set of content items, a media network relevance score based on a third set of modifier values applied to the first relevance score;
    calculating, by the computer device for each content item of the set of content items, a live programming event relevance score based on a fourth set of modifier values applied to the first relevance score;
    ranking, by the computer device, each content item of the set of content items based on the program title relevance scores, the media personality relevance scores, the media network relevance scores, and the live programming event relevance scores;
    receiving, by the computer device, a user input search term;
    generating, by the computer device and based on the search term, a user interface including multiple graphic icons corresponding to:
        a first number of the ranked content items that are currently available to a user and have associated rankings that exceed a first threshold value and
        a second number of the ranked content items that are not currently available to the user and have associated rankings that exceed a second threshold value that is greater than the first threshold value; and
    presenting, by the computer device via the user interface, the multiple graphic icons for selection by the user.

2. The method of claim 1, wherein each of the first set of modifier values, the second set of modifier values, the third set of modifier values, and the fourth set of modifier values include a selection history parameter.

3. The method of claim 1, wherein each of the first set of modifier values, the second set of modifier values, the third set of modifier values, and the fourth set of modifier values include a popularity index parameter.

4. The method of claim 1, wherein the multiple graphic icons include a program title, a media network identifier, information concerning a media personality, and a title of a live programming event.

5. The method of claim 1, wherein the first set of modifier values include a content title selection history parameter, a content popularity index parameter, a content title ratings index parameter, and a content time decay parameter.

6. The method of claim 1, wherein the second set of modifier values include a personality selection history parameter, and a personality popularity index parameter that is based on an amount of professional recognition received by a media personality.

7. The method of claim 1, wherein the fourth set of modifier values include an event selection history parameter, an event popularity index parameter, an event seasonality index parameter, and an event time decay parameter.

8. A network device comprising:
    a communication interface;
    a memory, wherein the memory stores instructions; and
    a processor, wherein the processor executes the instructions to:
        calculate a first relevance score for each content item of a set of content items identified in a catalog, wherein the first relevance scores correspond to a relevance of each content item with respect to a query term according to a term-weighting scheme;
        calculate, for each content item of the set of content items, a program title relevance score based on a first set of modifier values applied to the first relevance score;
        calculate, for each content item of the set of content items, a media personality relevance score based on a second set of modifier values applied to the first relevance score;
        calculate, for each content item of the set of content items, a media network relevance score based on a third set of modifier values applied to the first relevance score;
        calculate, for each content item of the set of content items, a live programming event relevance score based on a fourth set of modifier values applied to the first relevance score;
        rank each content item of the set of content items based on the program title relevance scores, the media personality relevance scores, the media network relevance scores, and the live programming event relevance scores;

receive a user input search term;
generate, based on the search term, a user interface including multiple graphic icons corresponding to:
a first number of the ranked content items that are currently available to a user and have associated rankings that exceed a first threshold value and
a second number of the ranked content items that are not currently available to the user and have associated rankings that exceed a second threshold value that is greater than the first threshold value; and
present, via the user interface, the multiple graphic icons for selection by the user.

9. The network device of claim 8, wherein each of the first set of modifier values, the second set of modifier values, the third set of modifier values, and the fourth set of modifier values include a user selection history parameter.

10. The network device of claim 8, wherein each of the first set of modifier values, the second set of modifier values, the third set of modifier values, and the fourth set of modifier values include a popularity index parameter.

11. The network device of claim 8, wherein the multiple graphic icons include a program title, a media network identifier, information concerning a media personality, and a title of a live programming event.

12. The network device of claim 8, wherein the first set of modifier values include a content title selection history parameter, a content popularity index parameter, a content title review ratings index parameter, and a content time decay parameter.

13. The network device of claim 8, wherein the second set of modifier values include a personality selection history parameter, and a personality popularity index parameter that is based on an amount of professional recognition received by a media personality.

14. The network device of claim 8, wherein the fourth set of modifier values include an event selection history parameter, an event popularity index parameter, an event seasonality index parameter, and an event time decay parameter.

15. A non-transitory, computer-readable storage medium storing instructions executable by a processor of a device, which when executed cause the device to:
calculate a first relevance score for each content item of a set of content items identified in a catalog, wherein the first relevance scores correspond to a relevance of each content item with respect to a query term according to a term-weighting scheme;
calculate, for each content item of the set of content items, a program title relevance score based on a first set of modifier values applied to the first relevance score;
calculate, for each content item of the set of content items, a media personality relevance score based on a second set of modifier values applied to the first relevance score;
calculate, for each content item of the set of content items, a media network relevance score based on a third set of modifier values applied to the first relevance score;
calculate, for each content item of the set of content items, a live programming event relevance score based on a fourth set of modifier values applied to the first relevance score;
rank each content item of the set of content items based on the program title relevance scores, the media personality relevance scores, the media network relevance scores, and the live programming event relevance scores;
receive a user input search term;
generate, based on the search term, a user interface including multiple graphic icons corresponding to:
a first number of the ranked content items that are currently available to a user and have associated rankings that exceed a first threshold value and
a second number of the ranked content items that are not currently available to the user and have associated rankings that exceed a second threshold value that is greater than the first threshold value; and
present, via the user interface, the multiple graphic icons for selection by the user.

16. The non-transitory, computer-readable storage medium of claim 15, wherein each of the first set of modifier values, the second set of modifier values, the third set of modifier values, and the fourth set of modifier values include a selection history parameter and a popularity index parameter.

17. The non-transitory, computer-readable storage medium of claim 15, wherein the multiple graphic icons include a program title, a media network identifier, information concerning a media personality, and a title of a live programming event.

18. The non-transitory, computer-readable storage medium of claim 15, wherein the first set of modifier values include a content title selection history parameter, a content popularity index parameter, a content title review ratings index parameter, and a content time decay parameter.

19. The non-transitory, computer-readable storage medium of claim 15, wherein the second set of modifier values include a personality selection history parameter, and a personality popularity index parameter that is based on an amount of professional recognition received by a media personality.

20. The non-transitory, computer-readable storage medium of claim 15, wherein the fourth set of modifier values include an event selection history parameter, an event popularity index parameter, an event seasonality index parameter, and an event time decay parameter.

* * * * *